L. E. WATERMAN, H. R. TRAPHAGEN, AND H. L. WATERMAN.
TRANSMISSION MECHANISM
APPLICATION FILED JUNE 9, 1919.
1,429,986.
Patented Sept. 26, 1922.
3 SHEETS—SHEET 2.
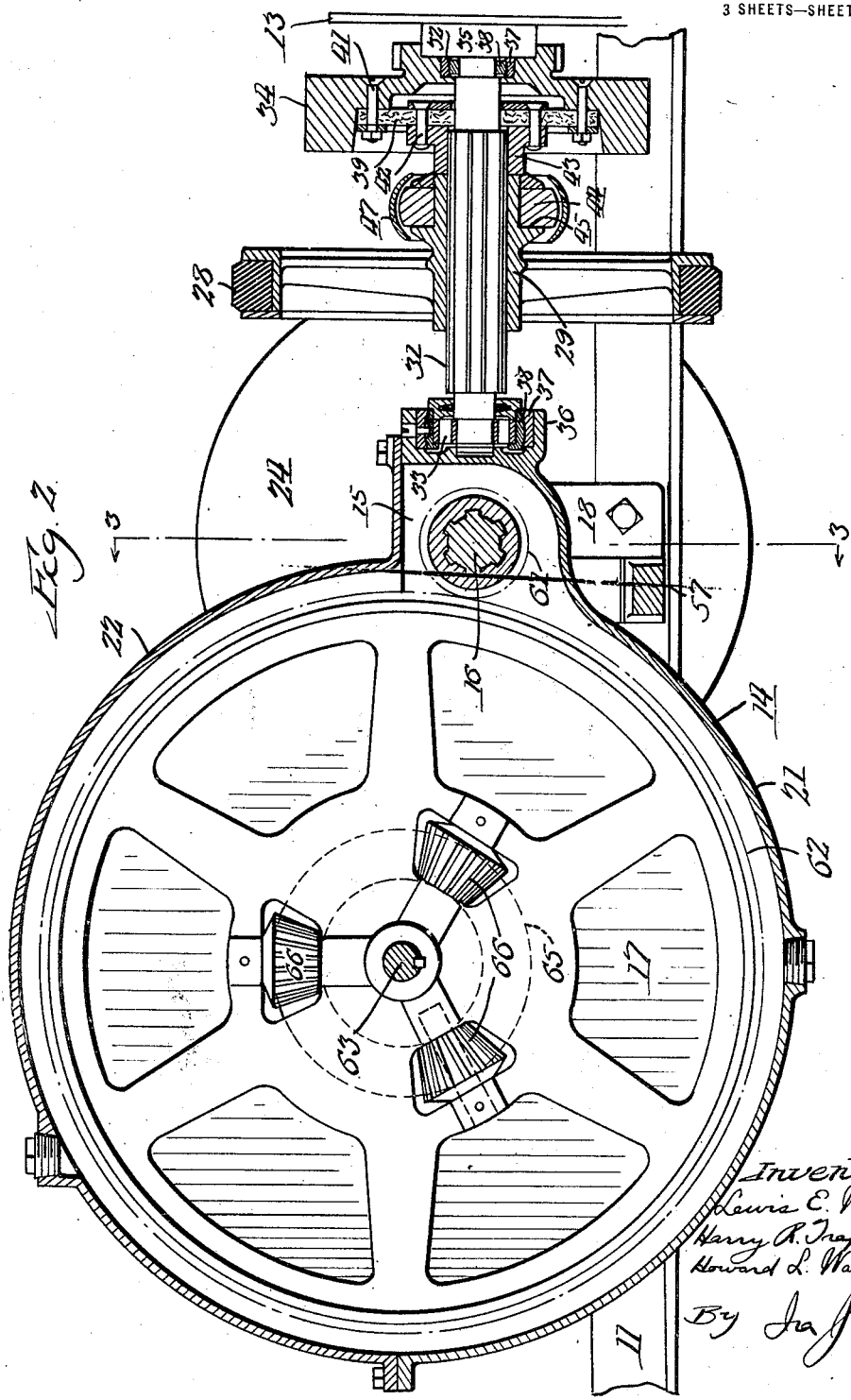

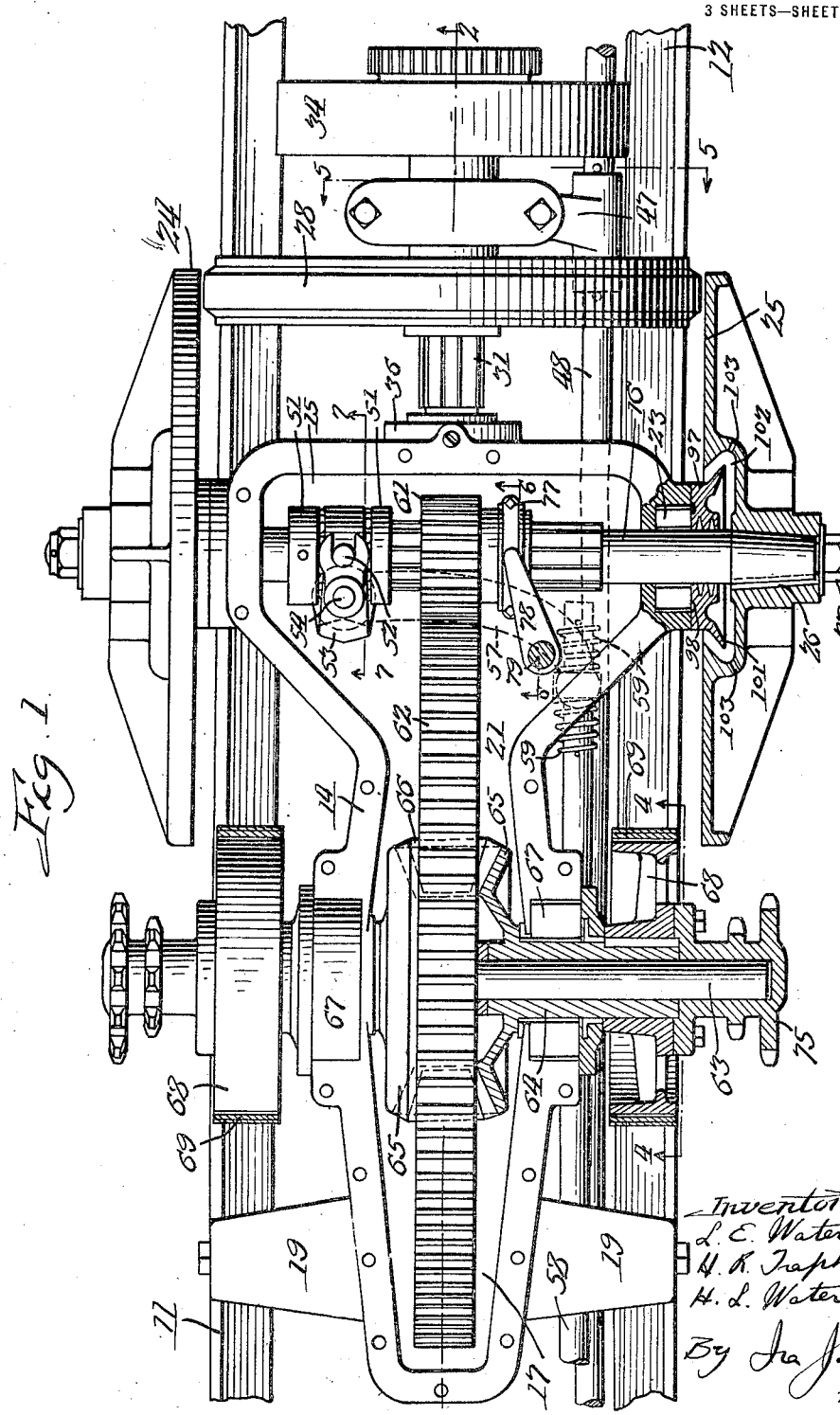

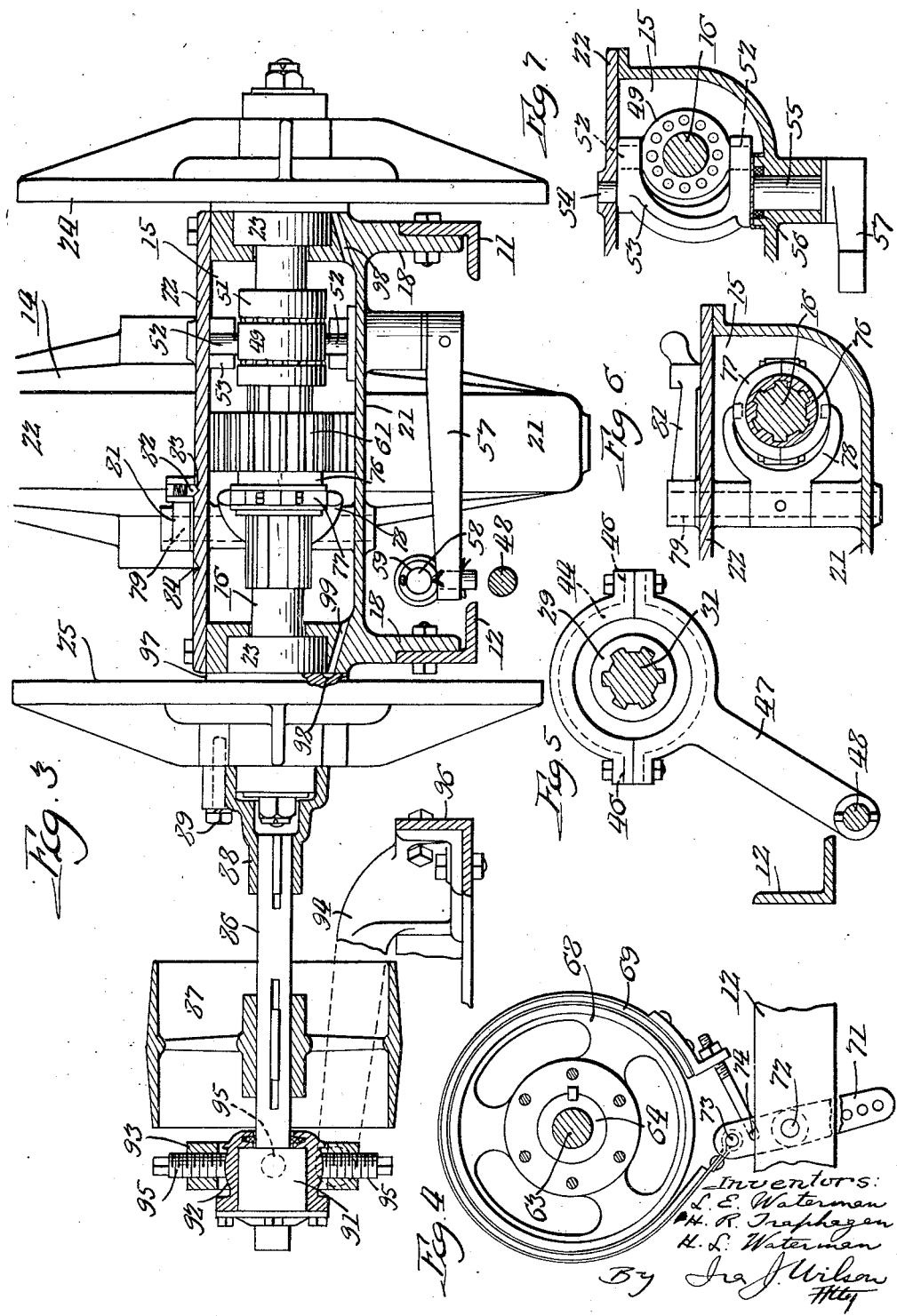

Patented Sept. 26, 1922.

1,429,986

UNITED STATES PATENT OFFICE.

LEWIS E. WATERMAN, HARRY R. TRAPHAGEN, AND HOWARD L. WATERMAN, OF ROCKFORD, ILLINOIS, ASSIGNORS TO EMERSON-BRANTINGHAM COMPANY, OF ROCKFORD, ILLINOIS, A CORPORATION OF ILLINOIS.

TRANSMISSION MECHANISM.

Application filed June 9, 1919. Serial No. 302,696.

*To all whom it may concern:*

Be it known that we, LEWIS E. WATERMAN, HARRY R. TRAPHAGEN, and HOWARD L. WATERMAN, citizens of the United States, residing at Rockford, in the county of Winnebago and State of Illinois, have invented certain new and useful Improvements in Transmission Mechanism, of which the following is a specification.

This invention relates to transmission mechanism adapted for motor vehicles, and especially to that class known as farm tractors, such as described in our co-pending application Serial No. 302,695.

Our object, primarily, is to provide an improved friction drive transmission including a differential mechanism peculiarly suited for a farm tractor or the like and arranged in a compact and novel manner for transmitting the engine power at the desired forward and reverse driving and power pulley speeds.

We have also aimed to provide a transmission mechanism of the character mentioned embodying various novel features so organized as to co-operate in producing a thoroughly practical and highly efficient transmission especially adapted for the varied working conditions and requirements of a farm tractor.

Our invention also contemplates the provision of a tractor transmission mechanism of such design that it is capable of production on a commercial basis at a comparatively low cost, and which is so constructed that it will serve in an entirely satisfactory manner the purposes desired.

Another object is to associate a power pulley with the transmission mechanism in a novel manner, whereby at little additional expense a practical power pulley drive is obtained that can be operated independently of the differential driving mechanism the latter of which is adapted only for tractor propelling purposes.

Other objects and attendant advantages will be apreciated as the invention becomes better understood by reference to the following description when considered in connection with the accompanying drawings, in which—

Figure 1 is a plan view partially in horizontal section of a transmission mechanism embodying our improvements, with the power pulley shaft and the top section of the transmission casing removed;

Fig. 2, a longitudinal sectional view through the transmission mechanism taken substantially on the line 2—2 of Fig. 1;

Fig. 3, a transverse sectional view taken substantially on the line 3—3 of Fig. 2, and showing the power pulley attached; and Figs. 4, 5, 6 and 7, detail sectional views taken on the lines 4—4, 5—5, 6—6 and 7—7 respectively, of Fig. 1.

As mentioned above, our improved transmission mechanism is peculiarly adapted for a farm tractor, although it will be evident as the invention becomes better understood, that it is applicable to other types of motor vehicles. In the present case, the transmission mechanism is supported by a frame comprising a pair of angle iron beams or sills 11 and 12 which constitute part of the main frame of a vehicle and extend centrally longitudinally thereof. Upon the forward end of this frame is adapted to be rigidly mounted an engine, only the extreme rear end of which is indicated in Fig. 2 by the character 13, and at the rear of the engine and separate therefrom is rigidly mounted a transmission casing designated generally by the character 14. A transmission casing shaped as shown to provide a forward narrow and laterally elongated compartment 15 inclosing a transverse friction disk shaft designated generally by the character 16 and a rear upright circular compartment 17 housing a differential mechanism, is rigidly supported at its forward and rear ends by legs 18 and 19 respectively, as shown in Figs. 1 and 2. The casing, it will be noted, is formed in two parts, viz: a base 21 and a top 22, suitably bolted together and forming an oil-tight and dust proof inclosure for those running parts which it is desired to keep well lubricated and free from dust and dirt.

The friction disk shaft 16 journaled in suitable bearings 23 projects at each end beyond the casing and has fixedly mounted upon its projecting ends, the friction disks 24 and 25. These friction disks may be suitably rigidly secured in any suitable manner to the shaft, and in the present instance are each held upon a tapered end of the shaft by a key 26 and a nut 27. The friction disk shaft is free to slide longitudinally of its axis for shifting the friction disks in a lateral direction into and out of engagement with an interposed friction driving wheel 28 mounted forwardly of the friction disk shaft and driven from the engine in the following manner.

Referring more particularly to Fig. 2, it will be noted that the friction driving wheel is provided with a hub 29 splined upon a shaft 31 which is journaled at its forward and rear ends in the bearings 32 and 33 respectively. These bearings are constructed in a novel manner to permit of certain flexibility in order to relieve the parts from undue strain and wear caused by relative movement between the engine and transmission casing due to torsion or twisting of the frame. In the present instance, the bearing 32 is carried by the fly wheel element 34 which is fixed to the part 35 in turn driven by the engine crank shaft. The rear bearing 33 is supported by a forward extension 36 of the transmission casing base. Both the forward extension and rear bearings include outer and inner parts 37 and 38 respectively, the meeting surfaces of which are on an arc struck from the center of the shaft in a plane parallel with the longitudinal axis thereof. This construction provides what may be termed a universal mounting for each end of the shaft 31 permitting disalignment of the shaft 31 with respect to the engine crank shaft without imposing any strain on the associated parts. Inasmuch as the flywheel 34 is rigidly connected with the driving part 35 a flexible driving connection is provided between the fly wheel and friction drive shaft 31 consisting of a diaphragm 39 of flexible material such as leather rigidly secured to its periphery by fastening means 41 to the fly wheel and at its center portion by the fastening means 42 to a central collar 43 splined on the shaft 31. The power then is transmitted from the part 35 to the fly wheel 34, then through the flexible diaphragm 39, the central collar 43, and the shaft 31 to the friction driving wheel.

Suitable means may be provided for shifting the driving wheel 28 longitudinally on the shaft 31 to either drive the friction disk 24 or 25 and at different distances from the center thereof to produce faster or slower forward or reverse speeds as will be manifest, depending upon which friction disk is engaged and on the location of the driving wheel. This means in the present instance, consists of a collar 44 disposed in the annular groove 45 in the hub of the friction drive wheel and trunnioned at its ends 46 (Fig. 5) in a shifting arm 47 fixed to an operating rod 48 adapted to be shifted at will by the operator through any suitable control means for moving the friction drive wheel rearwardly and forwardly on the shaft 31. It will be noted that the arm 47 entirely embraces the collar 45 and is shaped to provide annular edges overreaching the collar so as to prevent oil from being thrown onto the friction disks.

Novel means is now provided for moving the friction disk shaft longitudinally of its axis to engage and disengage either the disk 24 or 25 and the friction driving wheel and to hold the disks in set working positions. This means comprises a collar 49 loosely embracing the shaft 16 and interposed between collars 51 fixed against longitudinal movement on the shaft. The stationary collar 49 is equipped with trunnions 52 engaged by the ends of a yoke 53, which in turn is provided with top and lower pivot portions or trunnions 54 and 55 parallel with the trunnions 52 and pivotally mounted on the top and base sections of the transmission casing as shown in Fig. 7. The bearing for the lower trunnion or pivot shaft 55 is packed at 56 to prevent leakage of oil from the casing. Any suitable anti-friction thrust bearings may be employed between the shifting collar 49 and the revolving collars 51. An arm 57 fixed to the lower end of the yoke shaft 55 is connected at its outer end with an operating rod 58 through the agency of compression springs 59 at both sides of the arm 57. With this construction, when the rod 58 is moved in either direction, the shaft 16 will be shifted to engage either the friction disk 24 or 25 with the driving wheel 28 in a yielding engagement as distinguished from a sharp quick contact which is detrimental to the fibre surface of the driving wheel. The engaging of these friction disks by operation of the rod 58 produces forward and reverse driving speeds, as will be manifest, and by operating the rod 48 to shift the friction driving wheel the speed ratios may be changed.

The friction disk shaft 16 directly drives a differential mechanism by means of a spur pinion 61 splined on the shaft and meshing with the differential driving gear 62. This latter gear it will be noted is of relatively large diameter to secure the proper reduction and is entirely inclosed by the transmission casing so that all of the gears run in a dust-proof and oil-tight inclosure. The differential driving gear is keyed to a differential shaft 63 upon each end of which is freely revoluble a sleeve 64 carrying a bevel gear 65 in mesh with the intermediate bevel gears or pinions 66 carried by the differential driving gear. The sleeves 64 journaled in suitable bearings 67 on the transmission casing support the differential mechanism. Thus a differential mechanism of simple construction is directly driven from the friction disk shaft 16 at the proper speed reduction and a common casing supports and houses this mechanism, the friction disk shaft, and the means for shifting said shaft longitudinally. Upon the end of each sleeve 64 is rigidly secured a brake pulley 68 with which co-operates a split band 69 adapted to be contracted by operation of a lever 71 pivotally mounted at 72 upon the inner side of the frame beam or sill 12. It will be noted that the ends of the brake band are connected to the lever 71 at points 73 and 74 at a common side of the pivot 72 in such manner that upon swinging the lever 71 in a clockwise direction viewing Fig. 4, the brake band will be contracted in a very effective manner.

To each driven member of the differential is rigidly secured a driving member 75 for driving the adjacent track wheel, and in the present instance this driving member is in the form of a double sprocket gear, by means of which two general ranges of driving speeds may be transmitted to the traction wheels. The purpose of the differential mechanism is well known in the art; and the band brakes are used to retard rotation of either traction driving wheel at will, so that the power will be transmitted to the other at accelerated speed to turn the tractor about the retarded traction wheel as a pivot. The band brakes 69 are under the immediate control of the operator as explained in my application mentioned above, which shows a foot control permitting either brake to be instantly engaged for producing either slight steering movements or complete turns. By arranging the brakes on the driven members of the differential, the strain when engaging either brake is limited to a minimum number of parts, as it will be noted that when either brake is engaged the strain is relieved on the driving parts between such brake and its respective traction wheel.

Referring now to Fig. 3, we have combined with our improved transmission mechanism, a power pulley attachment whereby the power from the friction disk shaft 16 may be utilized for other purposes than for propelling a tractor. We have aimed to detachably secure a power pulley in co-axial alignment with the friction disk shaft so that the pulley will be continuously driven thereby, and to provide means for unmeshing the pinion 61 and gear 62 to break the driving train to the traction wheel at the most advantageous point. To this end we have provided the pinion 61 with a grooved hub 76 embraced by a collar 77 which is connected with a shifting yoke 78 having an operating shaft 79 extending through the top of the transmission casing and equipped with an arm or handle 81 by means of which the pinion is manually shifted into and out of engagement with the gear 62. In order to lock the handle 81 in its several positions it is equipped at its outer end with a spring pressed detent 82 adapted to engage in notches 83 and 84 in the transmission casing. When the arm 81 is shifted so that the detent engages in the notch 84 the pinion 61 will be withdrawn from the pinion 62 and held in such position. Thus in either position of the pinion 61 it is not disturbed by longitudinal shifting movement of the friction disk shaft. The shaft section 86 which carries the fixed power pulley 87 is suitably secured at its inner end to a coupling member 88 detachably fitting on the end of the friction disk 25 and secured thereto by means of a plurality of bolts 89 spaced circumferentially about the coupling member. A stable but adjustable bearing supports the extended end of the shaft 86 and consists of a suitable anti-friction bearing 91 carried by a casing 92 which in turn is adjustably supported within the annular head 93 of a bracket 94 through the agency of set screws 95 quarteringly arranged. The bracket 94 is rigidly secured to a frame part 96 which is fixed with respect to the transmission casing and the main frame. Inasmuch as the periphery of the bearing casing 92 is curved in a plane parallel with the longitudinal axis of the shaft 86 and is adjustable radially in all directions by means of set screws 95 the bearing 91 may be properly adjusted to align the shaft section 86 with the friction disk shaft.

From the foregoing, it will be noted that all of the gearing is inclosed within the transmission casing 14 and that the friction disks 24 and 25 are carried by the ends of a shaft which extends through this casing. The lubricant in the casing has a tendency to work out on the ends of the friction disk shaft and onto the faces of the friction disks. The deposit of oil on these faces very seriously affects the efficiency of a drive of this character and we have aimed to provide means for effectually preventing the oil from getting onto the disk faces. To this end a collar 97, Fig. 1, on each end of the friction disk shaft just inside of the friction disk and fixed to the transmission casing, is provided on its inner side with an annular groove 98 adapted for draining the oil which works outwardly through the bearing 23 to the passage 99, Fig. 3, and back to the casing compartment 15. The collar 97 is further shaped to provide an annular tapered flange 101 which projects into an annular chamber 102 in the face of the friction disk. The annular chamber 102 is radially enlarged and there is a plurality of oil discharge openings 103 communicating with the periphery of said channel. The oil which drips from the flange 101 into the chamber 102 will be thrown out by centrifugal force and discharged through the openings 103 so as not to interfere with the friction disk faces.

It will be seen that we have provided a compact, efficiently organized transmission mechanism well adapted for the needs of tractors, and while we have illustrated but a single preferred embodiment of our improvements it should be understood that various changes might be made in the construction and arrangement without departing from the spirit and scope of the invention as expressed in the appended claims, in which—

We claim:

1. The combination of a pair of power-plant sills, an engine and a transmission casing each fixedly mounted upon said sills in spaced relation, the transmission including a friction disk, a shaft driven by the engine and flexibly supported at its opposite ends, and a friction driving wheel splined on said shaft and adapted for driving said disk.

2. In a transmission mechanism, the combination of a casing, an axially shiftable shaft therein journaled at its end portions in bearings in the casing, each end of the shaft extending beyond its bearings and equipped at the exterior of the casing with a friction disk, a friction driving wheel between the disks adapted for driving either disk, each disk having an annular oil-receiving groove at its center, and means closing the outer end of each shaft bearing and reaching into the adjacent recesses forming an oil guide, whereby to prevent waste oil from reaching the friction faces of the disk.

3. The combination of a pair of laterally spaced power plant sills, a combined transmission and differential casing rigidly mounted on said sills intermediate the same, a transverse shaft in said casing journaled at its end portions in bearings therein, each end of the shaft extending beyond said bearing and equipped at its outer end with a friction disk disposed at the outer side of the adjacent sill, an engine fixedly mounted on the sills, a driving shaft connected to the engine shaft and journaled at one end in a bearing on the transmission casing, a friction driving wheel splined on said driving shaft and adapted to be moved lengthwise thereon to change its position radially with respect to the friction disks, and means for shifting the disk shaft axially to engage either disk with the driving wheel.

4. The combination of a frame, an engine and transmission casing each fixedly mounted on the frame, a drive shaft interposed between the casing and engine in axial alignment with the engine shaft and having a flexible connection with the engine, a bearing on the transmission casing for the opposite end of said drive shaft, said bearing having spherical complemental parts which compensate for any disalignment of the drive shaft caused by torsional strains on the frame, a driven part carried by the transmission casing, and a driving part mounted on said drive shaft for driving said driven part.

5. The combination of a pair of laterally spaced power plant sills, an engine and a transmission casing fixedly mounted on said sills in spaced relation, a transverse friction disk shaft journaled at its end portions in bearings in said casing, each end of said shaft extending beyond its bearing and equipped at its outer end with a friction disk disposed at the outer side of the adjacent sill, a drive shaft driven at one end by the engine and journaled at its opposite end in a bearing on the transmission casing, a friction driving wheel splined on said drive shaft and adapted to be shifted lengthwise thereon radially of the friction disks, means for so shifting the friction driving wheel, and means for shifting the friction disk shaft axially to engage either disk with the driving wheel.

LEWIS E. WATERMAN.
HARRY R. TRAPHAGEN.
HOWARD L. WATERMAN.